No. 747,461. PATENTED DEC. 22, 1903.
C. W. MILLETT.
CAN OR JAR.
APPLICATION FILED AUG. 6, 1902.
NO MODEL.

Witnesses:
H. Mallory
Joseph Merritt

Inventor
Charles W. Millett
By Wm H Honiss, Att'y

No. 747,461. Patented December 22, 1903.

UNITED STATES PATENT OFFICE.

CHARLES W. MILLETT, OF CANAJOHARIE, NEW YORK, ASSIGNOR, BY MESNE ASSIGNMENTS, TO WILLIAM H. HONISS AND WILLIAM A. LORENZ, OF HARTFORD, CONNECTICUT, AND BEECH-NUT PACKING COMPANY, OF CANAJOHARIE, NEW YORK, A CORPORATION OF NEW YORK.

CAN OR JAR.

SPECIFICATION forming part of Letters Patent No. 747,461, dated December 22, 1903.

Application filed August 6, 1902. Serial No. 118,596. (No model.)

*To all whom it may concern:*

Be it known that I, CHARLES W. MILLETT, a citizen of the United States, and a resident of Canajoharie, in the county of Montgomery and State of New York, have invented certain new and useful Improvements in Cans or Jars, of which the following is a full, clear, and exact specification.

This invention relates to improvements in hermetically-sealed cans and jars of the class employed for the packing of foods and other materials to exclude the air therefrom.

My preferred embodiment of this invention is shown in the accompanying drawings, in which—

Figure 1:
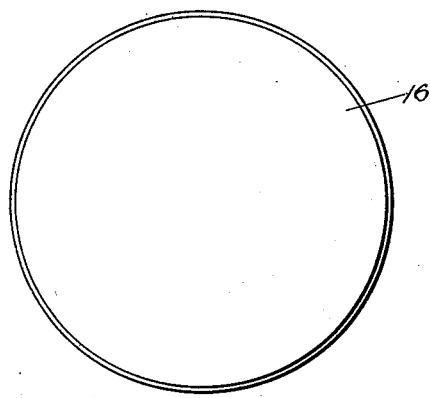
Figure 3:
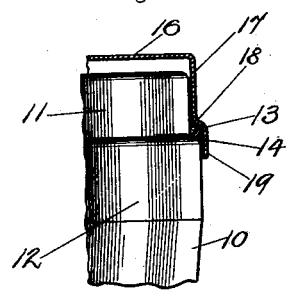
Figure 2:
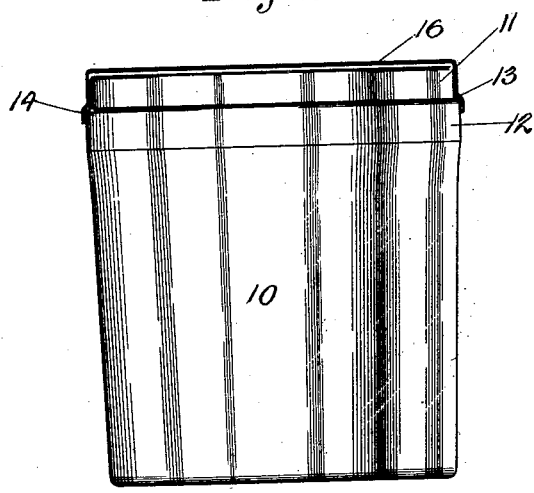
Figure 4:
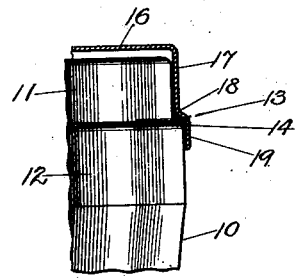

Figure 1 is a plan view. Fig. 2 is a side view showing the cap and gasket in section, taken through the center of Fig. 1, in closed or sealed position. Fig. 3 is an enlarged view of a portion of the jar, cap, and gasket of Fig. 2, but showing the cap in its position before sealing. Fig. 4 is a similar view showing the cap and gasket in sealed position.

Jars of this class are commonly provided with a circumferential groove semicircular in cross-section for receiving and locating the gasket in proper position prior to the final sealing operation, and these jars require the employment of a gasket considerably larger in cross-section than would otherwise be required in proportion to the size of the gasket and the consequent cross-sectional area of the gasket required to fill the groove. Moreover, after such a gasket is compressed by the sealing operation the lower edge of the gasket is usually exposed to the atmosphere to a considerable extent, while its upper edge is exposed to contact with the contents of the jar, both of which exposures are liable to have a destructive effect upon the material of which these gaskets are usually composed, so that in course of time the value of the gasket as a sealing medium becomes seriously impaired.

The principal object of the present invention is to enable a gasket extremely small in cross-section to be employed upon jars of this class, while yet providing a seal which shall hold the vacuum for a sufficiently long time to be commercially successful. I accomplish this object by the use of a jar and cap which fit together closely both above and below the gasket-seat and providing the jar and the cap with narrow circumferential shoulders which compress the gasket between them as the cap is forced down in the sealing operation. The cap and jar fit together so closely both above and below the gasket that the latter is practically confined to the shoulders, and therefore is not deformed to an appreciable extent above or below the gasket-seat. By this plan also both the air and the contents of the jar are substantially excluded from contact with the gasket or at least are confined to so small a portion thereof as to be practically free from injurious effects.

The upper or mouth portion of the jar 10 is formed with a cylindrical neck 11, which is smaller in diameter than the upper and substantially cylindrical portion 12 of the jar-body by the extent of the intervening narrow circumferential shoulder 14, which forms a sealing-seat for compressing the gasket 13, that shoulder being preferably slightly rounded, as best shown in Figs. 3 and 4. A flexible metallic cap 16 is employed for closing the mouth of the jar and is provided with a rim the inner contour of which substantially agrees with the described contour of the top of the jar, so that the cylindrical zones 17 and 19 substantially fit the corresponding portions 11 and 12, respectively, of the jar, and the circumferential shoulder 18 between these two zones coöperates with the shoulder 14 of the jar to compress the gasket, the cap being by this construction free to move only in a longitudinal direction in reference to the jar.

Prior to the sealing operation the gasket 13 is placed around the neck 11 adjacent to the sealing seat or shoulder 14, and the cap is placed in position, as shown in Fig. 3. The jar is then placed in or connected with a suitable receiver, by means of which the required vacuum is obtained within the jar, after which the cap is pressed down to seal the jar, and thus maintain the vacuum obtained therein. As the cap is thus pressed down the gasket 13 is compressed between the shoulder 18 of the cap and the shoulder 14 of the jar, and inasmuch as the shoulders are comparatively narrow the total amount of pressure which is exerted upon the cap by atmospheric pressure or otherwise is concentrated upon the narrow circumferential zone to which the gasket is confined, as shown in Fig. 4, thus increasing the security of the seal. Furthermore, this confining of the gasket prevents it from being distended or deformed to any appreciable extent either upwardly between the zone 17 of the cap and the portion 11 of the jar or downwardly between the zone 19 of the cap and the portion 12 of the jar.

Highly satisfactory results have been obtained with a jar and cap of this invention in which the shoulder corresponding to the shoulders 14 and 18 were as narrow as one sixty-fourth of an inch and where the gasket itself was not larger than one thirty-second of an inch square in cross-section. Such a jar and cap and gasket has maintained its hermetic seal for several months. The sizes and proportions of the shoulders and of the gasket may, however, be varied and should be adapted to the conditions of the service required.

In cans and jars of this class the cost of the gasket bears a very large proportion to the cost of the complete "package," which is the term applied to the combined jar, cap, and gasket. The gaskets for this class of cans and jars are usually made to a greater or less extent of a good quality of rubber, which is always expensive; hence the importance in point of economy of reducing the size of the gasket, since the amount of the material, and consequently the cost thereof, are thereby correspondingly reduced. This reduction in the size of the gasket is attended with a corresponding increase in the importance of protecting the gasket from the deteriorating action of the atmosphere on one side and the contents of the jar on the other side of the gasket. By this invention the injurious action referred to is substantially prevented, while the entire area of the gasket is brought within and thus made available for the compressing action, thus also avoiding the waste of the additional gasket material, which in other forms of sealing-joints is required to fill out the gasket-groove or is distended or deformed into the more or less open joints between the cap and the neck of the jar.

I claim as my invention—

1. A jar provided with a cylindrical neck, a projecting shoulder adjacent to and below said neck, a gasket, and a cap provided with a rim substantially fitting the cylindrical neck and fitting the jar below the shoulder, and having a circumferential shoulder for compressing the gasket against the shoulder of the jar.

2. A jar provided with a cylindrical neck, a projecting shoulder adjacent to and below said neck, and having a cylindrical contour below the shoulder, a gasket and a cap provided with a rim substantially fitting the cylindrical neck and fitting the cylindrical contour below the shoulder, and having a circumferential shoulder for compressing the gasket against the shoulder of the jar.

In testimony whereof I have signed my name to this specification, in the presence of two subscribing witnesses, this 4th day of August, 1902.

CHAS. W. MILLETT.

Witnesses:
  T. C. PEGRINN,
  BART RILEY.